No. 810,478.   PATENTED JAN. 23, 1906.
C. D. EDWARDS.
LANDSIDE WHEEL.
APPLICATION FILED JUNE 24, 1905.

Witnesses.
E. W. Jeppesen.
A. H. Opsahl.

Inventor:
C. D. Edwards
By his Attorneys
Williamson & Merchant

UNITED STATES PATENT OFFICE.

CHARLES D. EDWARDS, OF ALBERT LEA, MINNESOTA.

LANDSIDE-WHEEL.

No. 810,478.　　　Specification of Letters Patent.　　　Patented Jan. 23, 1906.

Application filed June 24, 1905. Serial No. 266,866.

*To all whom it may concern:*

Be it known that I, CHARLES D. EDWARDS, a citizen of the United States, residing at Albert Lea, in the county of Freeborn and State of Minnesota, have invented certain new and useful Improvements in Landside-Wheels; and I do hereby declare the following to be a full, clear, and exact description of the invention, such as will enable others skilled in the art to which it appertains to make and use the same.

My invention relates to so-called "landside-wheels," such as are used on graders and various other machines to carry more or less of the load and to prevent the machine from being crowded laterally.

My invention has for its object to improve such wheels in point of simplicity, durability, and particularly in point of high efficiency in the function of preventing the machine from being crowded sidewise.

The invention consists of the novel devices and combinations of devices hereinafter described, and defined in the claim.

The wheel herein disclosed and broadly claimed is shown and claimed in combination with other parts in a companion application filed by me of even date herewith, entitled "Road-grader."

The improved device is illustrated in the accompanying drawings, wherein like characters indicate like parts throughout both views.

Figure 1:
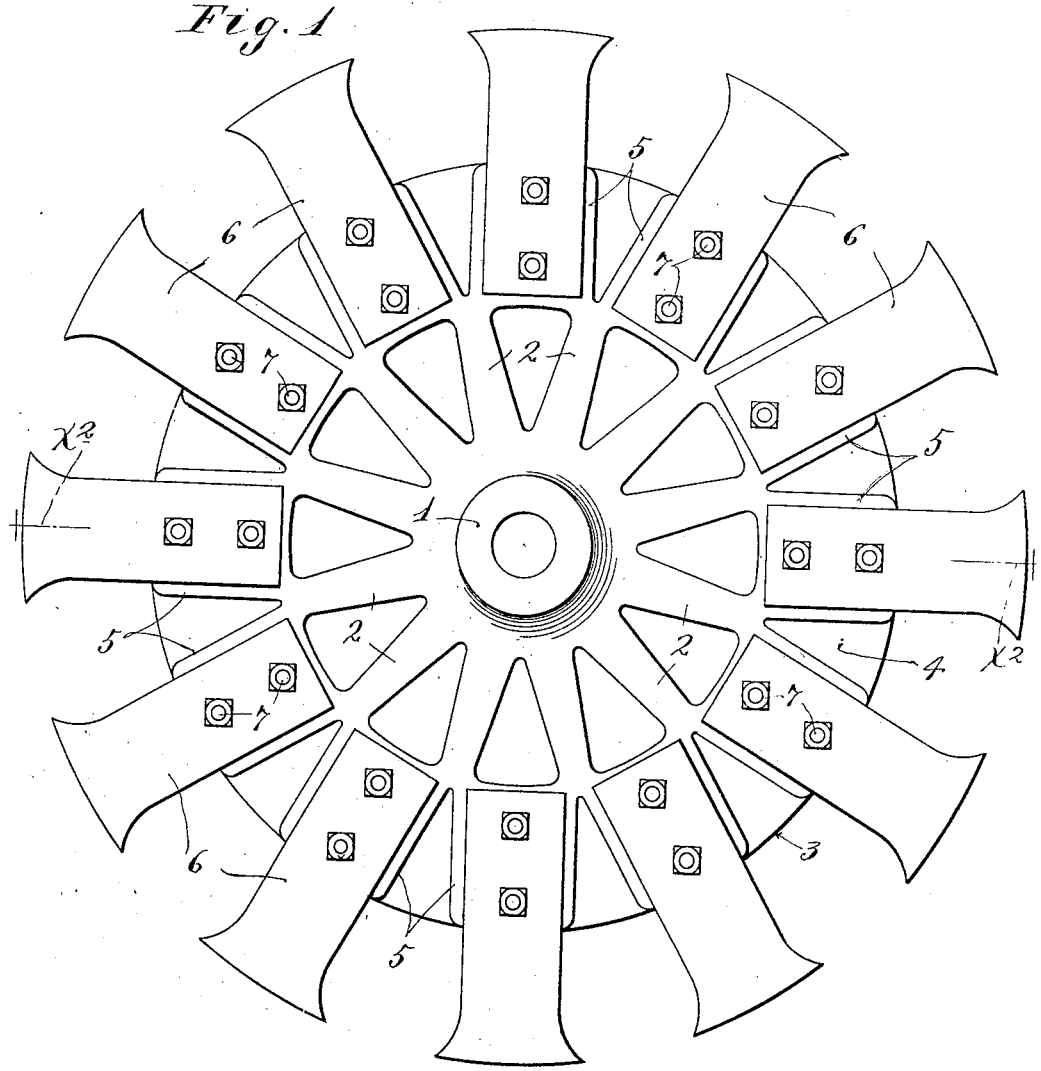
Figure 2:
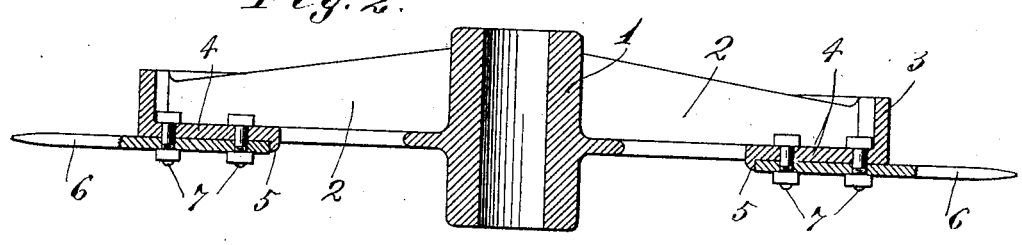

Figure 1 is a view in side elevation, showing the improved wheel; and Fig. 2 is a horizontal section taken on the line $x^2 x^2$ of Fig. 1.

The numeral 1 indicates the hub, the numeral 2 the ribbed arms, and the numeral 3 the rim of the wheel, which parts, as shown, are cast integral with each other. At one face of this wheel is formed an integrally-cast annular flange 4, that extends inward from one edge of the rim 3, unites directly with the ribbed arms 2, and is formed on its outer face with a plurality of shallow radially-disposed seats 5, that receive the inner ends of radially-extended thrust-resisting blades 6. These thrust-blades 6 lie in a common plane and together make up a broken or interrupted peripheral flange. The outer ends of the blades 6 are brought to sharp edges, so that the said blades will enter the ground far enough to positively prevent the wheel from being forced sidewise under lateral pressure thereon. The continuous peripheral rim 3 of the wheel will of course limit the distance that the blades 6 will be forced into the ground. In hard soil the blades 6 will not enter into the ground to any such extent as that just indicated; but in soft soil they will enter the ground to the extreme depth permitted by the rim of the wheel. The blades 6 are preferably constructed of steel, their outer edges hardened, and they are detachably secured in their respective seats 5, preferably by means of short nutted bolts 7. It will be noted that the blades 6 lie in a plane which is entirely at one side of the peripheral face of the rim of the wheel. This feature is important because it secures the thrust-blades on the pressure side of the wheel—that is to say, on that side of the wheel that is pressed laterally against the soil under lateral pressure from the scraper or other machine to which the wheel is applied. This arrangement causes the wheel to be self-clearing in its action—that is, causes the dirt to be forced laterally from the periphery of the wheel instead of packing the same tightly in the angles between the periphery of the wheel and the thrust-blades, as would be the case under any other arrangement.

The improved wheel herewith illustrated has been constructed and put into actual use and has been found highly efficient for the purposes had in view.

In practice I have found that a wheel constructed with a plurality of thrust-resisting blades arranged in a common plane has much higher efficiency in preventing side thrusts or crowding of the wheel than can possibly be attained in a wheel having a continuous or unbroken thrust-resisting flange.

What I claim, and desire to secure by Letters Patent of the United States, is as follows:

A wheel having a hub 1, arms 2, rim 3 and an annular flange 4, said parts being cast integrally, and said flange 4 having the radial seats 5, of detachable thrust-resisting blades 6 lying in a common plane and a plurality of sharp-edged thrust-resisting blades fitting in said seats 5 and detachably held therein by nutted bolts 7, substantially as described.

In testimony whereof I affix my signature in presence of two witnesses.

CHARLES D. EDWARDS.

Witnesses:
　C. B. KELLAR,
　R. B. SKINNER.